US007141787B2

(12) United States Patent
Laprade

(10) Patent No.: US 7,141,787 B2
(45) Date of Patent: Nov. 28, 2006

(54) DETECTOR FOR A CO-AXIAL BIPOLAR TIME-OF-FLIGHT MASS SPECTROMETER

(75) Inventor: Bruce Laprade, Holland, MA (US)

(73) Assignee: Burle Technologies, Inc., Wilmington, DE (US)

( * ) Notice: Subject to any disclaimer, the term of this patent is extended or adjusted under 35 U.S.C. 154(b) by 0 days.

(21) Appl. No.: 11/131,393

(22) Filed: May 17, 2005

(65) Prior Publication Data

US 2005/0253062 A1 Nov. 17, 2005

Related U.S. Application Data

(60) Provisional application No. 60/571,782, filed on May 17, 2004.

(51) Int. Cl.
*H01J 49/40* (2006.01)
*H01J 40/14* (2006.01)
*H01J 40/00* (2006.01)
*G01K 1/08* (2006.01)

(52) U.S. Cl. ............................... 250/287; 250/214 VT; 250/207; 250/397; 313/103 CM; 313/103 R

(58) Field of Classification Search ................ 250/287, 250/288, 207, 299, 397; 313/104 CM, 104 R
See application file for complete search history.

(56) References Cited

U.S. PATENT DOCUMENTS

| | | | | |
|---|---|---|---|---|
| 4,322,629 | A * | 3/1982 | Eloy et al. | 250/299 |
| 4,454,424 | A * | 6/1984 | Strauss et al. | 250/390.11 |
| 4,810,882 | A * | 3/1989 | Bateman | 250/281 |
| 5,770,858 | A * | 6/1998 | Fuchs et al. | 250/287 |
| 5,990,483 | A * | 11/1999 | Shariv et al. | 250/397 |
| 6,674,063 | B1 * | 1/2004 | Ferenc | 250/214 VT |
| 6,828,729 | B1 * | 12/2004 | Owens et al. | 313/528 |
| 7,026,177 | B1 * | 4/2006 | Laprade | 438/20 |
| 7,049,598 | B1 * | 5/2006 | Jordanov et al. | 250/363.01 |
| 2004/0206911 | A1 * | 10/2004 | Laprade | 250/397 |
| 2004/0211896 | A1 * | 10/2004 | Laprade et al. | 250/288 |

* cited by examiner

*Primary Examiner*—John R. Lee
*Assistant Examiner*—Johnnie L Smith, II
(74) *Attorney, Agent, or Firm*—Dann, Dorfman, Herrell and Skillman, P.C.

(57) ABSTRACT

A detector for a coaxial bipolar time-of-flight mass spectrometer is described. The detector includes a microchannel plate, a scintillator disposed in parallel relation to said microchannel plate, and a mirror oriented at an angle relative to said scintillator. The angle of the mirror is selected to reflect photons given off by the scintillator in a direction substantially orthogonal to the scintillator. The microchannel plate, the scintillator, and the mirror each have an opening formed centrally therein. The detector according to this aspect of the invention also includes a transparent tube extending through the central openings formed in each of the microchannel plate, the scintillator, and the mirror. A photomultiplier tube is coupled to the detector for receiving photons reflected by the mirror. A coaxial bipolar time-of-flight mass spectrometer incorporating the detector is also described.

15 Claims, 6 Drawing Sheets

DETECTOR FOR A CO-AXIAL BIPOLAR TIME-OF-FLIGHT MASS SPECTROMETER

This application claims the benefit of U.S. Provisional Application No. 60/571,782, filed May 17, 2004.

FIELD OF THE INVENTION

This invention relates to a detector for a co-axial bipolar time-of-flight mass spectrometer and to a co-axial bipolar time-of-flight mass spectrometer that uses such a detector.

BACKGROUND OF THE INVENTION

Mass spectrometers can be used in a wide variety of applications in medical, food processing, environmental monitoring, and space exploration. Time-of-flight mass spectroscopy has become the most widely used technique for identifying very large organic molecules. This technique has become the method of choice for most drug discovery and polymer applications. The time-of-flight technique is frequently chosen because it is the only technique capable of the high mass sensitivity needed for many substances.

The time-of-flight mass spectrometry (TOF-MS) technique is a known technique which has seen resurgence in popularity because of cost reductions in electronics and the advent of high temporal resolution detectors. The availability of high temporal resolution detectors has enabled shorter flight tubes to be used, which leads to smaller vacuum systems and lower overall instrument costs. These designs are particularly well suited for use in portable instruments.

Three types of electron multipliers have been used in time-of-flight mass spectrometers (TOF-MS): single channel electron multipliers (SCEM's), discrete dynodes (DD's), and micro channel plates (MCP's). Single channel electron multipliers are no longer used in modern instruments because of their limited temporal resolution (20–30 ns at FWHM) and dynamic range. Discrete dynode electron multipliers exhibit good dynamic range, but are used in moderate and low resolution applications because they provide relatively poor pulse widths (typically, 6–10 ns at FWHM).

MCP-based detectors are used in virtually all high resolution applications because they provide the highest temporal resolution (400 ps at FWHM). In order to preserve the high temporal resolution of MCP-based detectors it is necessary to use a 50 ohm impedance-matched anode and transmission line. Fifty ohm impedance-matched anodes are conical in shape and are typically terminated with an SMA or BNC connector.

In the operation of a typical linear MALDI TOF instrument, analyte molecules, dispersed among matrix material of a sample 11 are ionized by a nitrogen laser 13 as shown in FIG. 1. The resultant ions are held (delayed extraction) and then ejected down a flight tube by the application of high voltage pulses. Mass separation occurs during the flight (typically about 1 meter) to the detector 15, with the lower mass ions 17 arriving first, followed by progressively larger mass ions 19. Upon arrival of an ion at the detector 15, the electron multiplier 21 produces a charge pulse corresponding to the arrival time of each ion as shown by the trace in FIG. 2. A high speed digitizer is then used to record the arrival times of the ions, from which the mass of the ion can be determined.

A second type of time-of-flight instrument utilizes an ion mirror to enable the ions to traverse the flight tube twice, thereby increasing the separation distance (and time) of ions with differing masses. FIG. 3 illustrates a typical reflectron-type time-of-flight mass filter. In operation, ions 31*a*–31*e* of various masses are injected into a pusher plate assembly 33 and then ejected orthogonally into the flight tube 35 by the application of a high voltage pulse. The ions then travel to the ion mirror or reflectron lens 37 which reverses their direction and directs the ions to the detector 39 located approximately the same distance from the ion mirror 37 as the ion source. In this arrangement the ions travel approximately twice the distance as in the other types of detectors. Thus, they separate twice as far from each other in time and space without substantially increasing the size of the vacuum system.

A third time-of-flight spectrometer configuration is also known. This geometry, known as co-axial time-of-flight, combines the vacuum chamber simplicity of the linear time-of-flight construction with the enhanced mass resolution provided by the reflectron geometry. FIG. 4 illustrates a coaxial time-of-flight mass spectrometer arrangement. In the coaxial time-of-flight spectrometer, the ions are created behind the detector plate and the microchannel plate and launched into the linear flight tube through center holes in the detector plate and the microchannel plate. A special ion mirror reflects the ions back to the detector. The ion mirror causes the ions to fan out radially in order to impact the active area of the MCP at the end of their return flight.

Despite the simplicity and low cost advantages of the coaxial time-of-flight geometry, instrument designers have largely abandoned this geometry because high temporal resolution detectors could not be produced. MCP based detectors with center holes have been used for scanning electron microscopes (SEMs) and focused ion beam (FIB) applications for many years. Such detectors were also used in early time-of-flight instruments as co-axial TOF detectors. The drawback of the previous design detectors in modern instruments is that the flat metal anodes used to collect the resultant charge from the MCP in response to ion impacts, produced a pulse with a severe ring which lasted several nanoseconds in duration, rendering the known detectors unusable for high resolution TOF mass spectrometry. The detector according to the present invention is a high temporal resolution coaxial time-of flight detector that has been developed to overcome the deficiencies in the known detectors.

SUMMARY OF THE INVENTION

In accordance with a first aspect of the present invention, there is provided a detector for a coaxial bipolar time-of-flight mass spectrometer. The detector includes a microchannel plate, a scintillator disposed in parallel relation to said microchannel plate, and a mirror orientated at an angle relative to said scintillator. The angle of the mirror is selected to reflect photons given off by the scintillator in a direction substantially orthogonal to the scintillator. The microchannel plate, the scintillator, and the mirror each have an opening formed centrally therein. The detector according to this aspect of the invention also includes a transparent tube extending through the central openings formed in each of the microchannel plate, the scintillator, and the mirror. A photomultiplier tube is coupled to the detector for receiving photons reflected by the mirror.

In accordance with another aspect of the present invention, there is provided a coaxial bipolar time-of-flight mass spectrometer that incorporates a detector according to the first aspect of this invention. In the operation of the coaxial mass spectrometer, ions are injected into the spectrometer through the transparent tube by a pusher plate. The ions travel through the flight tube and are reflected by an ion mirror. The reflected ions are incident on the annular region of the microchannel plate. The microchannel plate generates a plurality of secondary electrons that impinge on the annular area of the scintillator. The scintillator generates a plurality of photons that are reflected by the annular portion of the mirror toward the photomultiplier tube. The photomultiplier tube converts the photons into electrical pulses that correspond to the arrival times of the ions.

BRIEF DESCRIPTION OF THE DRAWINGS

The foregoing background and summary, as well as the following detailed description will be better understood when read in connection with the drawings, wherein.

DETAILED DESCRIPTION OF A PREFERRED EMBODIMENT

Figure 1:
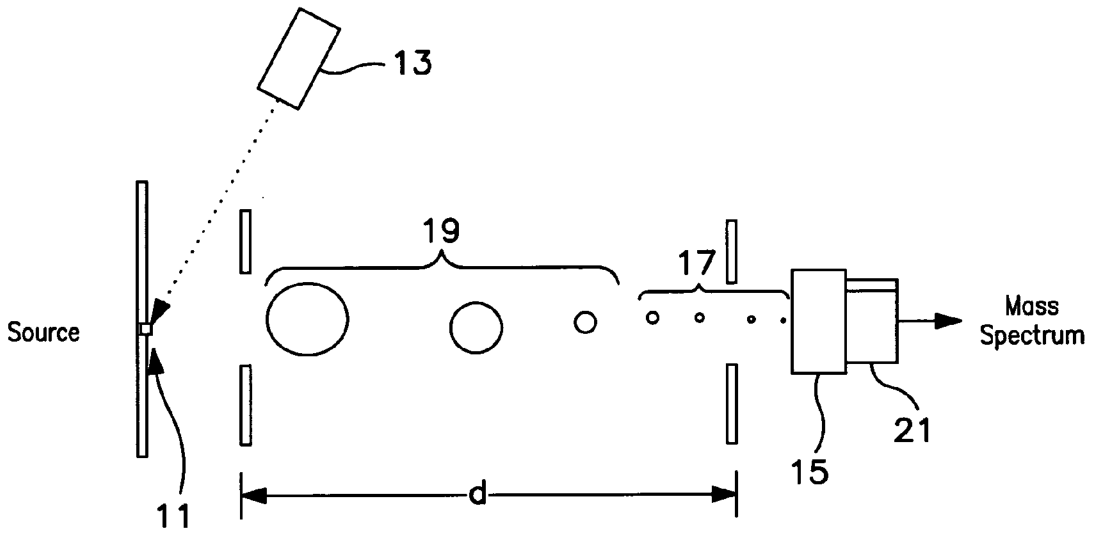
FIG. 1 PRIOR ART
FIG. 1 is a schematic view of a MALDI time-of-flight mass spectrometer.
Figure 2:
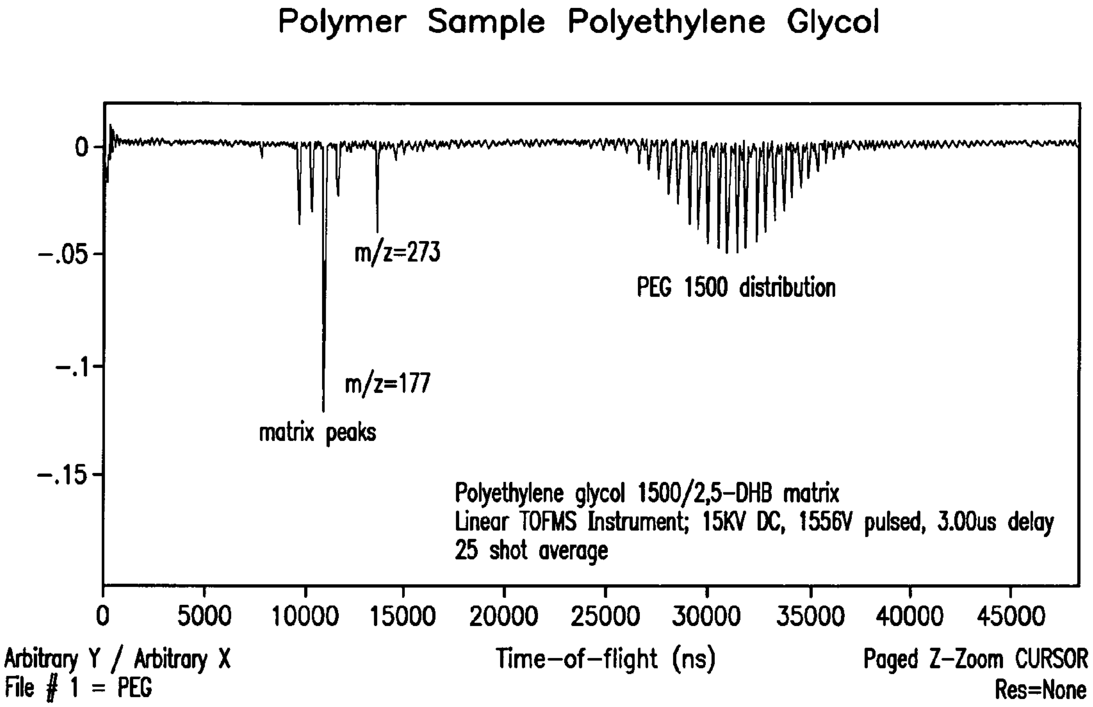
FIG. 2 is a graph of ion arrival times for a polyethylene glycol sample from a mass spectrometer of the type shown in FIG. 1.
Figure 3:
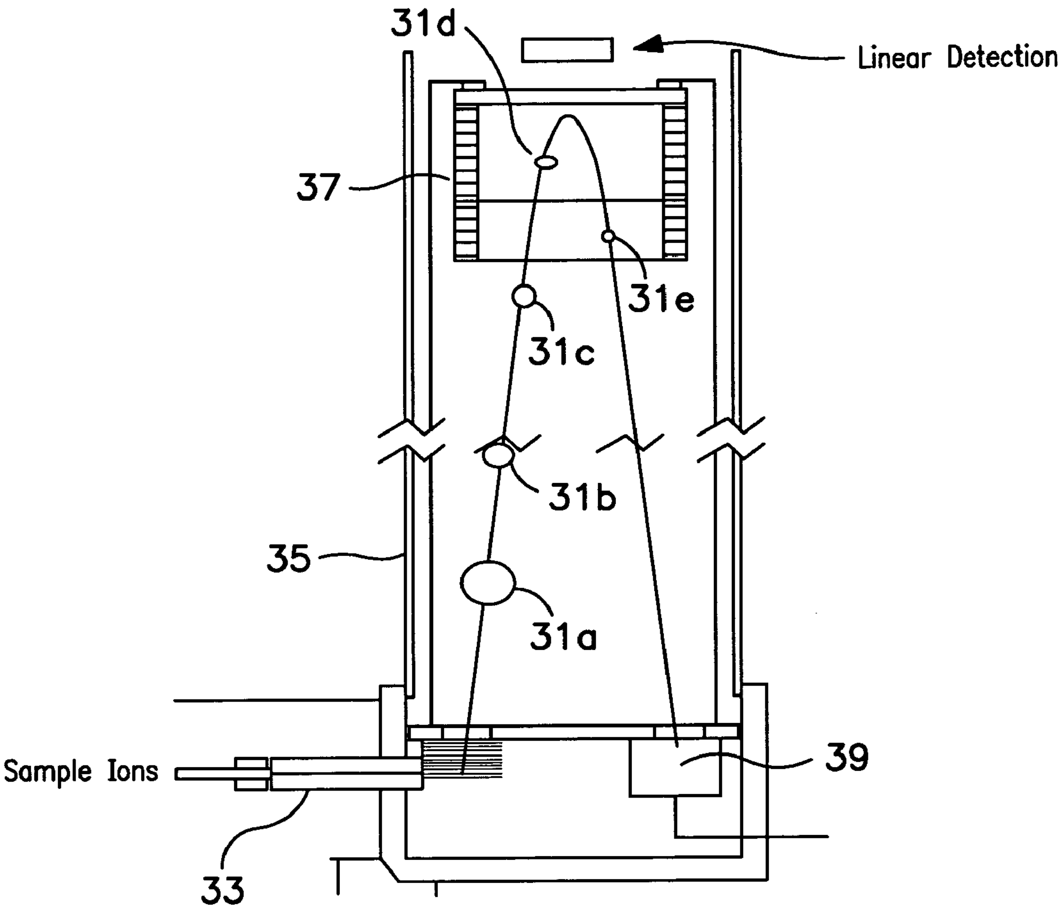
FIG. 3 PRIOR ART
FIG. 3 is a schematic view of reflectron type time-of-flight mass spectrometer.
Figure 4:
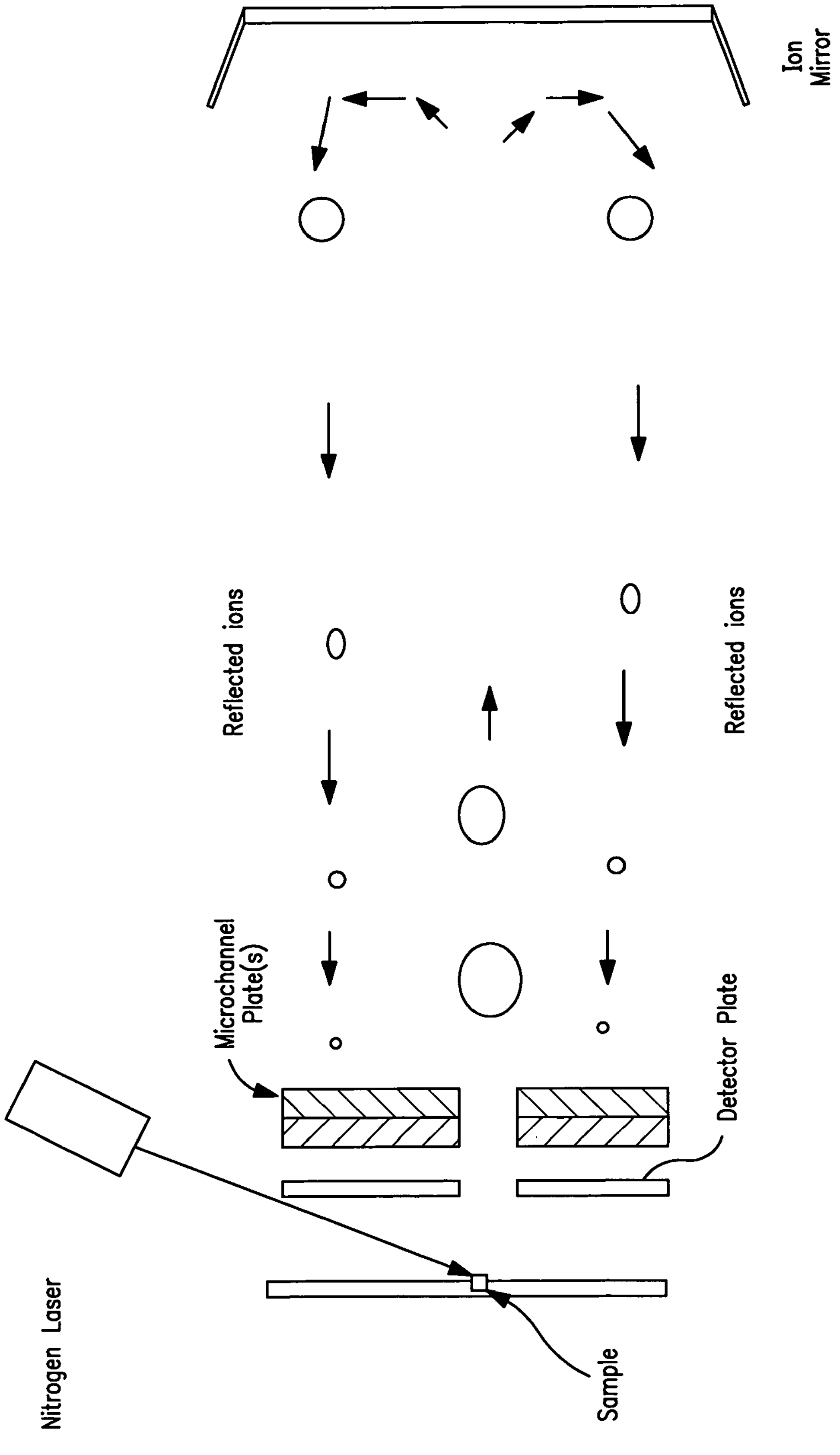
FIG. 4 PRIOR ART
FIG. 4 is a schematic view of a coaxial time-of-flight mass spectrometer.
Figure 5:
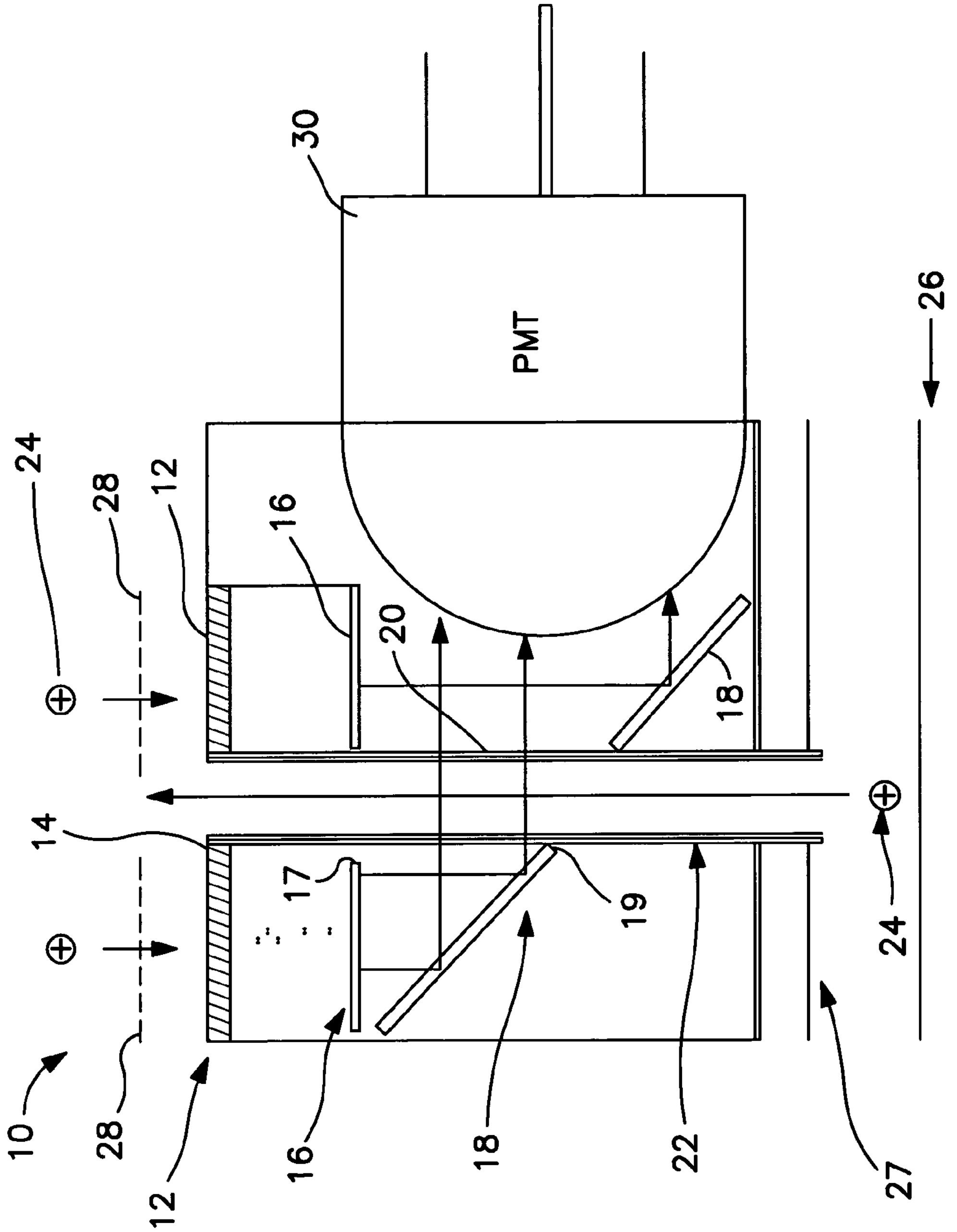
FIG. 5 is a schematic view of a detector for a coaxial time-of-flight mass spectrometer according to the present invention.

A new type of time-of-flight detector has been developed which incorporates the high temporal resolution of the microchannel-plate-based detectors with the co-axial capabilities of the flat metal anode type detectors. The new detector is based on the bipolar TOF technology. The detector 10 illustrated in FIG. 5 consists of a microchannel plate 12 with a small (6 mm typ.) center hole 14. The microchannel plate 12 is followed by a scintillator 16 and mirror 18 each having a center hole 17 and 19, respectively, formed therethrough. A clear glass tube 20 with a transparent conductive coating 22 on the inside surface thereof extends through the center holes 14, 17, and 19. Although the mirror 18 is shown as a planar mirror in the drawing, it can also be concave mirror.

Figure 6:
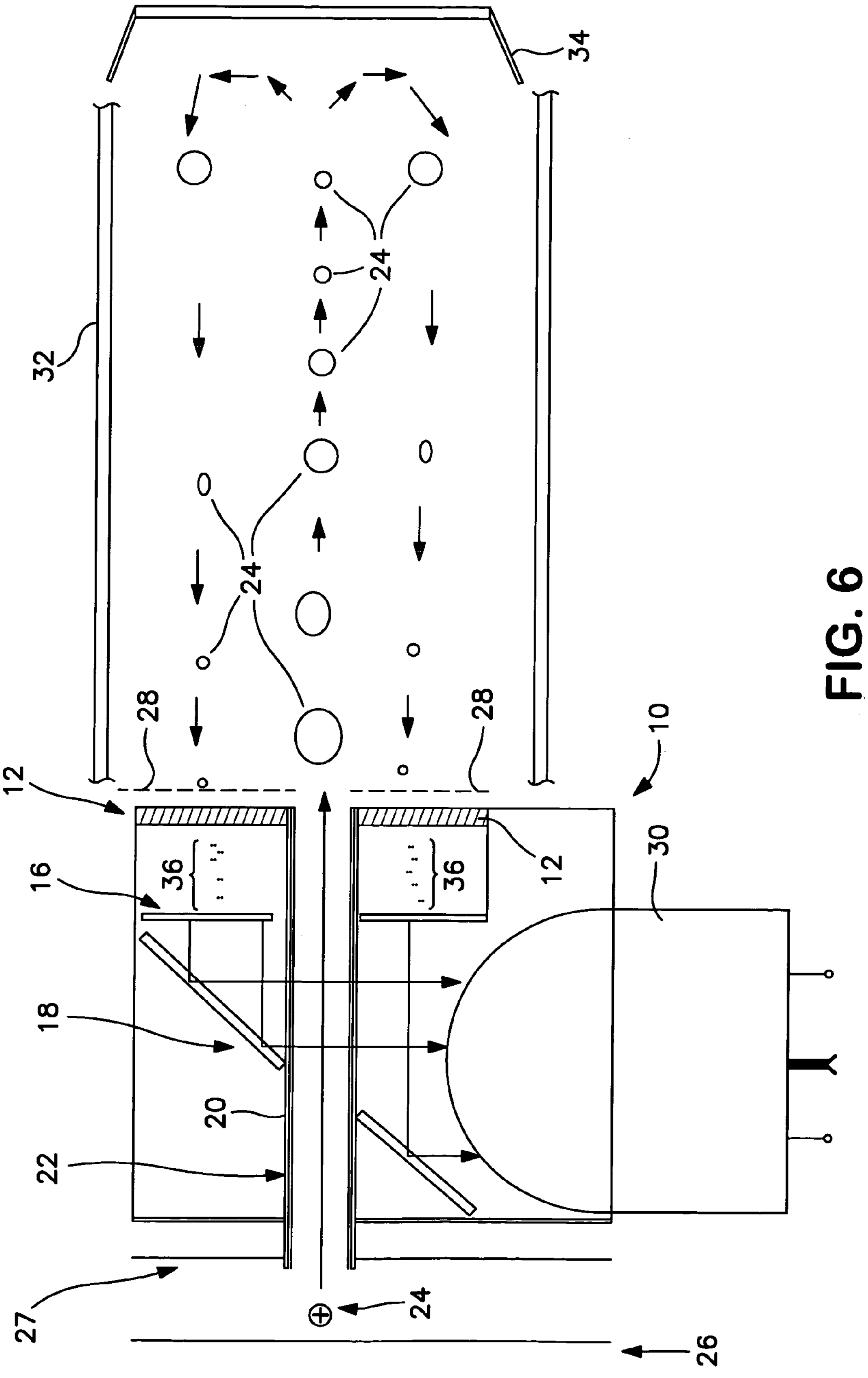
FIG. 6 is a schematic view of a coaxial time-of-flight mass spectrometer incorporating the detector of FIG. 5.

Referring now to FIG. 6, there is shown a coaxial bipolar time-of-flight mass spectrometer according to the present invention. In operation of the spectrometer, ions 24 are created in the ionization area at the bottom of the detector 10 and launched down the middle of the clear glass tube 20 by the application of a high voltage pulse on the pusher plate assembly 26, which includes a field plate 27. The ions 24 exit the front end of the conductive glass tube 20 and enter the flight tube 32. During the flight, the ions 24 become separated in space by their respective masses. As they approach the ion mirror 34 located at the end of the flight tube, the ions reverse direction and are spread out from the original circular ion beam into an annular ring (donut) with ions of the same mass occupying the same plane.

The ions of different masses are further separated in space until they collide with the input surface of the MCP 12. A grid 28 may be placed in front of the MCP 12 in order to prevent the field of the MCP from interfering with the flight of the ions. The grid 28 has a relatively large central opening formed therein to permit the ions to pass unobstructed into the flight tube 32. Upon collision with the MCP 12, a plurality of secondary electrons are generated which are in turn accelerated into the high speed scintillator 16. Upon collision with the high speed scintillator, a plurality of photons are created. The photons are reflected by the mirror 18 which is placed diagonally with respect to the scintillator 16 and a photomultiplier tube (PMT) 30 which converts the plurality of photons to charge pulses corresponding to the arrival times of the ions. The mirror 18 is preferably oriented at an angle of about 45° relative to the scintillator. The arrival time of the charge pulses can then be used to determine the masses of the ions.

The efficiency of the detector 10 is not degraded by the presence of the glass center tube 20 because ions which impact the MCP 12 in a location between the center tube 20 and the outside diameter of the MCP 12 will produce photons which are reflected through the clear glass center tube 20. Charging of the center tube 20 by stray ion collisions is prevented by the presence of the transparent conductive coating 22, such as tin oxide, deposited on the inside surface of the tube 20.

It will be recognized by those skilled in the art that changes or modifications may be made to the above-described embodiments without departing from the broad inventive concepts of the invention. It is understood, therefore, that the invention is not limited to the particular embodiment which is described, but is intended to cover all modifications and changes within the scope and spirit of the invention as described above and set forth in the appended claims.

What is claimed is:

1. A detector for a coaxial time-of-flight mass spectrometer comprising:

a microchannel plate;

a scintillator disposed in parallel relation to said microchannel plate;

a mirror oriented diagonally relative to said scintillator;

said microchannel plate, said scintillator, and said mirror each having an opening formed centrally therein, and said detector further comprising:

a transparent tube extending through the central openings formed in each of said microchannel plate, said scintillator, and said mirror; and a photomultiplier tube disposed for receiving photons reflected by said mirror.

2. A detector as set forth in claim 1 wherein said transparent tube has a transparent conductive coating applied to an inner surface thereof.

3. A detector as set forth in claim 1 or 2 wherein the transparent tube is formed of glass.

4. A detector as set forth in claim 1 wherein said transparent tube is oriented substantially orthogonally relative to said scintillator and said microchannel plate.

5. A detector as set forth in claim 1 wherein said mirror is oriented at an angle selected to reflect photons given off by said scintillator in a direction substantially orthogonal to said scintillator.

6. A detector as set forth in claim 1 wherein said mirror is oriented at an angle of about 45° relative to said scintillator.

7. A detector as set forth in claim 1 wherein said photomultiplier is oriented substantially orthogonally relative to said scintillator.

8. A coaxial time-of-flight mass spectrometer comprising:
means for generating ions of a material to be analyzed;
a flight tube;
means for injecting the ions into said flight tube;
an ion mirror disposed at one end of said flight tube; and
a detector disposed at an opposite end of said flight tube from said ion mirror, wherein said detector comprises:
a microchannel plate disposed for receiving ions reflected from said ion mirror;
a scintillator disposed in parallel relation to said microchannel plate;
a photon mirror oriented diagonally relative to said scintillator;
said microchannel plate, said scintillator, and said mirror each having an opening formed centrally therein, and said detector further comprising:
a transparent tube extending through the central openings formed in each of said microchannel plate, said scintillator, and said photon mirror; and
a photomultiplier tube disposed for receiving photons reflected by said photon mirror.

9. A coaxial time-of-flight mass spectrometer as set forth in claim 8 wherein the scintillator is aligned coaxially with the microchannel plate.

10. A coaxial time-of-flight mass spectrometer as set forth in claim 8 wherein the transparent tube has a transparent conductive coating applied to an inner surface thereof.

11. A coaxial time-of-flight mass spectrometer as set forth in claim 8 wherein the transparent tube is formed of glass.

12. A coaxial time-of-flight mass spectrometer as set forth in claim 8 wherein said transparent tube is oriented substantially orthogonally relative to said scintillator and said microchannel plate.

13. A coaxial time-of-flight mass spectrometer as set forth in claim 8 wherein said photon mirror is oriented at an angle selected to reflect photons given off by said scintillator in a direction substantially orthogonal to said scintillator.

14. A coaxial time-of-flight mass spectrometer as set forth in claim 8 wherein said photon mirror is oriented at an angle of about 45° relative to said scintillator.

15. A coaxial time-of-flight mass spectrometer as set forth in claim 8 wherein said photomultiplier is oriented substantially orthogonally relative to said scintillator.

* * * * *